United States Patent
Ito

(10) Patent No.: US 7,393,897 B2
(45) Date of Patent: Jul. 1, 2008

(54) METHOD FOR MANUFACTURING OLEFINIC THERMOPLASTIC ELASTOMER COMPOSITION

(75) Inventor: Yuichi Ito, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 286 days.

(21) Appl. No.: 10/372,819

(22) Filed: Feb. 26, 2003

(65) Prior Publication Data
US 2003/0160359 A1 Aug. 28, 2003

(30) Foreign Application Priority Data
Feb. 26, 2002 (JP) .............................. 2002-050360

(51) Int. Cl.
*C08L 23/16* (2006.01)
(52) U.S. Cl. .................. 525/86; 525/232; 525/240; 264/211
(58) Field of Classification Search .................. 525/86, 525/197, 232, 240; 264/211
See application file for complete search history.

(56) References Cited

U.S. PATENT DOCUMENTS

| | | | | |
|---|---|---|---|---|
| 4,342,844 A | * | 8/1982 | Torenbeek et al. | 525/387 |
| 4,454,092 A | * | 6/1984 | Shimizu et al. | 264/349 |
| 4,785,045 A | * | 11/1988 | Yonekura et al. | 524/528 |
| 4,891,392 A | * | 1/1990 | Abe et al. | 523/200 |
| 5,298,211 A | | 3/1994 | Hamanaka et al. | |
| 5,635,237 A | * | 6/1997 | Greenberg et al. | 426/646 |
| 6,316,508 B1 | * | 11/2001 | Matsushita et al. | 521/41 |
| 6,399,709 B1 | * | 6/2002 | Moriguchi et al. | 525/199 |
| 6,602,959 B2 | * | 8/2003 | Vestberg et al. | 525/242 |

FOREIGN PATENT DOCUMENTS

| | | |
|---|---|---|
| EP | 0 072 203 A | 2/1983 |
| EP | 0 547 843 A | 6/1993 |
| JP | 2-52648 | 11/1990 |
| KR | 10-0213425 | 8/1999 |

* cited by examiner

*Primary Examiner*—Randy Gulakowski
*Assistant Examiner*—Olga Asinovsky
(74) *Attorney, Agent, or Firm*—Birch, Stewart, Kolasch & Birch, LLP

(57) ABSTRACT

The method for manufacturing a thermoplastic elastomer composition of the present invention comprises continuously feeding a mixture comprising pelletized olefinic resin (A), a pulverized product (B) obtained by pulverizing bulk olefinic rubber, and a crosslinking agent (C) into a continuous kneading machine, and performing a dynamic heat treatment to yield the thermoplastic elastomer composition. An olefinic thermoplastic elastomer composition having excellent tensile characteristics and molded appearance can be manufactured with high productivity by the method of the present invention.

7 Claims, No Drawings

METHOD FOR MANUFACTURING OLEFINIC THERMOPLASTIC ELASTOMER COMPOSITION

BACKGROUND OF THE INVENTION

1. Field of the Invention

The present invention relates to a method for manufacturing an olefinic thermoplastic elastomer composition having excellent tensile characteristics and molded appearance.

2. Description of the Related Art

Olefinic thermoplastic elastomers are widely used as energy-saving, resource-saving thermoplastic elastomers, particularly as substitutes for soft vinyl chloride and vulcanized rubber in automobile parts, industrial machine parts, electronic/electrical machine parts, construction materials, and the like because of being lightweight and easy to recycle.

Dynamic crosslinking methods are carried out in a variety of forms for kneading olefinic rubber and olefinic resin in the presence of a crosslinking agent. Among these, methods for admixing a polyolefin resin after dynamically heat-treating and crosslinking olefinic rubber together with a crosslinking agent in a Banbury mixer, and methods of dynamic crosslinking in the coexistence with polyolefin resin in a Banbury mixer are uneconomical in comparison with continuous methods because of the use of a batch-style Banbury mixer. In addition, the rubber and resin sometimes fail to disperse uniformly, and consistent quality is difficult to obtain.

A method in which olefinic rubber and olefinic resin are melted and mixed in advance in a Banbury mixer, the mixture is cooled and pelletized, and the resultant pellets are fed into an extruder along with a crosslinking agent and dynamically crosslinked inside the extruder has been proposed as a technique for obtaining an olefinic thermoplastic elastomer with stable quality and uniform dispersion of the rubber and resin, but this method is nonetheless lacking in economic feasibility in the sense that the rubber and the resin must be melted and mixed before being crosslinked.

Aimed at overcoming the foregoing drawbacks, a technique has been proposed, for example, in Japanese Patent Publication No. H2-52648, whereby an olefinic thermoplastic elastomer having excellent physical properties is continuously manufactured by a simplified method in which the rubber and resin are uniformly dispersed by using pelletized olefinic rubber and pelletized olefinic resin and by feeding these materials to a twin-screw extruder-together with a crosslinking agent.

In actuality however, the ethylene/α-olefin/polyene copolymer rubber mainly used as a raw material rubber for an olefinic thermoplastic elastomer is supplied in a block usually called a "bale", and must therefore be fed to an extruder or other kneading machine and processed into pellets by way of a melted state to obtain a pelletized ethylene/α-olefin/polyene copolymer rubber, which in addition to being not necessarily economical, may also cause the temperature inside the extruder to reach high levels due to shear-induced heating, heat degradation to occur, and the performance of the final olefinic thermoplastic elastomer product to be adversely affected when ethylene/α-olefin/polyene copolymer rubber, which has a high molecular weight in comparison with a resin, is melted and kneaded alone under ordinary conditions.

An object of the present invention, which is aimed at overcoming the drawbacks that accompany conventional techniques such as those described above, is to provide a method whereby an olefinic thermoplastic elastomer composition having excellent tensile characteristics and molded appearance can be manufactured with high productivity.

SUMMARY OF THE INVENTION

The method for manufacturing an olefinic thermoplastic elastomer of the present invention comprises continuously feeding a mixture comprising pelletized olefinic resin (A), a pulverized product (B) obtained by pulverizing bulk olefinic rubber, and a crosslinking agent (C) into a continuous kneading machine and performing a dynamic heat treatment to yield the olefinic thermoplastic elastomer.

DESCRIPTION OF THE PREFERRED EMBODIMENTS

A detailed description will be given hereafter of the method for manufacturing an olefinic thermoplastic elastomer in accordance with the present invention.

The components used in this olefinic thermoplastic elastomer will first be described.

Pelletized Olefinic Resin (A)

The olefinic resin used in the present invention comprises a high-molecular-weight solid product obtained by polymerizing one, two or more kinds of monoolefin by either a high-pressure method or a low-pressure method. Examples of such resins include isotactic and syndiotactic monoolefin polymeric resins. These representative resins are commercially available.

Specifically, ethylene, propylene, 1-butene, 1-pentene, 1-hexene, 1-octene, 1-decene, 2-methyl-1-propene, 3-methyl-1-pentene, 4-methyl-1-pentene, 5-methyl-1-hexene, and the like can be cited as suitable raw material olefins for the aforementioned olefinic resin. These olefins may be used singly or as mixtures of two or more kinds.

Random or block copolymerization can be performed, and any type of polymerization may be employed as long as a resin material is obtained. These olefinic resins may be used singly or as combinations of two or more kinds of resins.

Propylene-based polymers, or more specifically, propylene homopolymers, propylene/ethylene block copolymers, propylene/ethylene random copolymers, propylene/ethylene/butene random copolymers, and the like are particularly preferred among these olefinic resins.

The propylene-based polymer preferably contains constitutional units derived from propylene to the extent of 80 mol % to 100 mol %, and more preferably 90 mol % to 100 mol %.

It is preferable that the MFR (ASTM D 1238-65T, 230° C.) be normally in the range of 0.01 to 100 g/10 min, and particularly 0.5 to 50 g/10 min, for the olefinic resin used in the present invention.

It is also preferable that the crystallinity of the olefinic resin used in the present invention, as measured by the DSC method, be 20% or greater, and particularly 40% or greater.

The olefinic resin of the present invention is used in pellet form. The shape of the pellets is not particularly limited, with possible examples thereof including a sphere, hemisphere, cylinder, prism, tablet, and various other shapes. The size thereof is also not particularly limited, but a mean grain diameter that ranges, for example, from 1 to 10 mm is preferred.

The pellet manufacturing method may be a cold-cut method, hot-cut method, or other commonly known method.

The aforementioned olefinic resin has the role of enhancing the fluidity and heat-resistance of the composition.

In the present invention, the olefinic resin is used preferably in a ratio of 10 to 60 parts by weight, more preferably 15 to 50 parts by weight per 100 parts by weight of the total quantity of olefinic resin and olefinic rubber.

When an olefinic resin is used in a ratio such as those mentioned above, a thermoplastic elastomer composition obtained has excellent tensile characteristics and molded appearance.

Pulverized Bulk Olefinic Rubber (B)

The olefinic rubber is defined as a rubber-like polymer containing an α-olefin as a constitutional unit thereof. The α-olefin has a carbon number of preferably 2 to 20, more preferably 2 to 10. Examples include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and combinations of these.

The olefinic rubber of the present invention may contain a polyene, preferably an unconjugated polyene as desired.

The unconjugated polyene is an unconjugated polyene in which there is only one polymerizable carbon-carbon double bond per molecule among the carbon-carbon double bonds thereof. If one of the two or more vinyl groups is a terminal vinyl group, the other vinyl groups preferably assume an internal rather than terminal olefin structure.

Such unconjugated polyenes include aliphatic polyenes and alicyclic polyenes.

Such aliphatic polyenes specifically include 1,4-hexadiene, 3-methyl-1,4-hexadiene, 4-methyl-1,4-hexadiene, 5-methyl-1, 4-hexadiene, 4-ethyl-1,4-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, and the like.

A polyene comprising an alicyclic moiety that contains one unsaturated bond, and a chain moiety that contains an internal olefin bond is suitable for the alicyclic polyene, and may, for example, include 5-ethylidene-2-norbornene, 5-isopropylidene-2-norbornene, 6-chloromethyl-5-isopropenyl-2-norbornene, 5-vinyl-2-norbornene, dicyclopentadiene, and the like.

2,3-Diisopropylidene-5-norbornene, 2-ethylidene-3-isopropylidene-5-norbornene, and other trienes and the like may also be cited.

Among these unconjugated polyenes as well, 5-ethylidene-2-norbornene, 1,4-hexadiene, dicyclopentadiene, 5-vinyl-2-norbornene, and the like are particularly preferred.

These unconjugated polyenes can be used singly or as combinations of two or more kinds thereof.

As determined by the DSC method, the crystallinity of the olefinic rubber of the present invention is preferably less than 20%, more preferably 10% or less.

Also, the Mooney viscosity ML1+4 (125° C.) of the olefinic rubber of the present invention is preferably 20 to 200, more preferably 40 to 150, even more preferably 40 to 100.

Specifically, ethylene/α-olefin/(unconjugated polyene) copolymer rubber, propylene/α-olefin copolymer rubber, and the like are included as examples of this kind of olefinic rubber, of which the ethylene/α-olefin/(unconjugated polyene) copolymer rubber is preferred.

Ethylene/α-Olefin/(Unconjugated Polyene) Copolymer Rubber

The ethylene/α-olefin/(unconjugated polyene) copolymer rubber used in the present invention comprises a rubber obtained by randomly copolymerizing ethylene, α-olefin, and, as desired, an unconjugated polyene; and may specifically include ethylene/α-olefin copolymer rubber and ethylene/α-olefin/unconjugated polyene copolymer rubber.

An α-olefin having 3 to 10 carbon atoms is preferable as the α-olefin comprising the ethylene/α-olefin/(unconjugated polyene) copolymer rubber. In particular, propylene, 1-butene, 1-hexene, 1-octene, and the like are preferably used therefor.

The ethylene/α-olefin/(unconjugated polyene) copolymer rubber preferably used in the present invention possesses the following characteristics:

(1) Ethylene/α-olefin composition ratio

The ethylene/α-olefin/(unconjugated polyene) copolymer rubber used in the present invention contains (a) units derived from ethylene and (b) units derived from an α-olefin (which are sometimes referred to hereafter simply as "α-olefins") having three or more carbon atoms, preferably in an [(a)/(b)] molar ratio of 40/60 to 95/5, more preferably 55/45 to 90/10.

The ethylene/α-olefin/(unconjugated polyene) copolymer rubber having the above of ethylene/α-olefin composition ratio excels both in low-temperature flexibility and heat resistance.

In the ethylene/α-olefin/(unconjugated polyene) copolymer rubber, low-temperature flexibility is good when the ethylene/α-olefin composition ratio is 95/5 or less, on the other hand, heat resistance is excellent when the ratio is 40/60 or greater.

(2) Iodine Value

When the ethylene/α-olefin/(unconjugated polyene) copolymer rubber is an ethylene/α-olefin/unconjugated polyene copolymer rubber, the iodine value thereof, which is an index of the unconjugated polyene component quantity, is preferably 1 to 50, more preferably 5 to 40.

With an ethylene/α-olefin/unconjugated polyene copolymer rubber having an iodine value such as that described above, it is possible to manufacture an olefinic thermoplastic elastomer having high dynamic crosslinking efficiency, and excellent tensile characteristics and rubber elasticity.

(3) Mooney Viscosity

The Mooney viscosity ML1+4 (125° C.) of the ethylene/α-olefin/(unconjugated polyene) copolymer rubber is preferably 20 to 200, more preferably 40 to 150, even more preferably 40 to 100.

(4) Oil Extension Amount

Whether the ethylene/α-olefin/(unconjugated polyene) copolymer rubber (B) is oil-extended or not with a softner is immaterial. Pulverization is facilitated when bulk rubber without being oil-extended is used, and is therefore preferable.

When the material is extended with oil, the Mooney viscosity ML1+4 (125° C.), as measured in the oil-extended state, is preferably 20 to 120, more preferably 40 to 100. The softener will be described hereafter.

In the present invention, the pulverized bulk-form (bale-form) olefinic rubber (B) is defined as a pulverized product that is not pelletized after pulverization.

A conventional pulverizing machine can be used for pulverization. The pulverized fragments may have any size as long as the material can be fed without any problems into the continuous kneading machine for performing dynamic crosslinking, and it is preferable that not less than 90% of the fragments be approximately of a size that can pass through a hole (of a punching plate, for example) with a diameter of 10 mm, and more preferably that not less than 90% thereof be approximately of a size that can pass through a hole with a diameter of 8 mm.

Pulverization is possible in a short time and at low cost, and the pulverized product is less likely to scatter into the air when pulverized rubber fragments have an average particle diameter of 1 mm or greater, and particularly 3 mm or greater.

In the present invention, the olefinic rubber is used preferably in a ratio of 40 to 90 parts by weight, and more preferably 50 to 85 parts by weight per 100 parts by weight of the total quantity of olefinic resin and olefinic rubber.

Other Components

In addition to olefinic resin, olefinic rubber, and a crosslinking agent, other resin components, other rubber components, softeners, inorganic fillers, and the like may be incorporated in the olefinic thermoplastic elastomer of the present invention.

The following are included as examples of rubbers other than the olefinic rubber used in the present invention.

Any commonly known polybutadiene, polyisoprene, styrene/butadiene block copolymers, hydrogenated products thereof, styrene/isoprene block copolymers, and hydrogenated products thereof.

A rubber other than the olefinic rubber used in the present invention can be used in a ratio of preferably 50 parts by weight or less, more preferably 30 parts by weight or less per 100 parts by weight of the olefinic rubber.

A softener commonly used with rubber can be employed as the softener in the present invention.

Specific examples include process oil, lubricating oil, paraffin, liquid paraffin, petroleum asphalt, vaseline, and other petroleum-based materials; coal tar, coal tar pitch, and other coal tars; castor oil, linseed oil, rapeseed oil, soybean oil, palm oil, and other fatty oils; tall oil, beeswax, carnauba wax, lanolin, and other waxes; recinoleic acid, palmitic acid, stearic acid, barium stearate, calcium stearate, and other fatty acids or metallic salts thereof; petroleum resin, coumarone-indene resin, atactic polypropylene, and other synthetic polymer materials;

dioctyl phthalate, dioctyl adipate, dioctyl sebacate, and other ester-type plasticizers; and other microcrystalline waxes, rubber substitutes (factices), liquid polybutadiene, modified liquid polybutadiene, liquid Thiokol, and the like.

Among these as well, paraffin-based process oils are particularly preferred, among which paraffin-based process oils with a 5-vol% distillate temperature of 445° C. or greater are preferable for their resistance to bleed-out.

In the present invention, the softner may be oil-extended into the olefinic rubber in advance or added by direct injection into the continuous kneading machine during dynamic crosslinking. In that case, the quantity directly injected into the continuous kneading machine for resin corresponds to a ratio of 40 parts by weight or less, preferably 30 parts by weight or less, more preferably 25 parts by weight or less per 100 parts by weight of the total quantity of olefinic resin and olefinic rubber. Injecting a quantity in this range is preferable because it makes uniform dispersion of the elastomer and the oil easier.

Consequently, it is necessary to oil-extend the olefinic rubber in advance when greater amount needs to be added. The corresponding oil extension quantity is as previously described.

Specific examples of inorganic fillers used in the present invention include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass pellets, Shirasu balloons, basic magnesium sulfate whiskers, calcium titanate whiskers, aluminum borate whiskers, and the like.

In the present invention, the inorganic filler is used preferably in a ratio of 100 parts by weight or less, more preferably 2 to 50 parts by weight per 100 parts by weight of the total quantity of olefinic resin and olefinic rubber. In the present invention, the rubber elasticity and moldability of the heat-resistant thermoplastic elastomer composition thus obtained is better maintained if the quantity of inorganic filler used is 100 parts by weight or less.

Furthermore, commonly known conventional heat-resistant stabilizers, antioxidants, weather-resistance stabilizers, antistatic agents, metallic soaps, waxes and other lubricants, and the like can be added into the olefinic thermoplastic elastomer of the present invention in a range that is not detrimental to the object of the present invention.

The olefinic thermoplastic elastomer composition of the present invention is obtained by a process whereby the aforementioned olefinic resin pellets (A), a crosslinking agent (C), and other components, which are incorporated as needed, are mixed without melting or pelletizing the pulverized bulk olefinic rubber (B), and the resulting mixture is fed into a continuous kneading machine and is dynamically crosslinked in the presence of a crosslinking agent.

As used herein, "dynamic crosslinking" refers to inducing a crosslinking reaction by kneading in a melted state in the presence of a crosslinking agent.

The crosslinking agent used in the present invention includes organic peroxides, phenol resins, sulfur, hydrosilicone-based compounds, amino resins, quinone or derivatives thereof, amino-based compounds, azo-based compounds, epoxy-based compounds, isocyanate, and the like, i.e., crosslinking agents generally used in thermosetting rubber. Organic peroxides are particularly preferable among these crosslinking agents. Organic peroxides with a 1-minute half-life temperature of 185° C. or more are preferable.

Specific examples of organic peroxides used in the present invention include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxy-isopropyl)benzene, 1,1-bis(tert-butylperoxy)-3,3,5-trimethyl cyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropyl carbonate, diacetyl peroxide, lauroyl peroxide, tert-butyl cumyl peroxide, and the like.

Among these, 2,5-dimethyl-2,5-di-(tert-butylperoxy)hexane, 2,5-dimethyl-2,5-di-(tert-butylperoxy)hexyne-3, and 1,3-bis(tert-butylperoxyisopropyl)benzene are preferable for odor and scorch stability, and 2,5-dimethyl-2,5-di-(tert-butylperoxy)hexyne-3 is the most preferable.

Such crosslinking agents are used in quantities that are preferably 0.02 to 5 parts by weight, more preferably 0.05 to 3 parts by weight per 100 parts by weight of the total quantity of pelletized olefinic resin (A) and pulverized olefinic rubber (B).

If the incorporating quantity of crosslinking agent is not less than 0.02 part by weight, heat resistance, tensile characteristics, elastic recovery, impact resilience, and the like are sufficient in the olefinic thermoplastic elastomer composition thus obtained. The olefinic thermoplastic elastomer composition thus obtained has good moldability if this incorporating quantity is 5 parts by weight or less.

In the present invention, peroxy crosslinking coagents such as sulfur, p-quinone dioxime, p,p'-dibenzoyl quinone dioxime, N-methyl-N-4-dinitrosoaniline, nitrosobenzene, diphenyl guanidine, and trimethylol propane-N,N'-m-phenylene dimaleimide; divinyl benzene, triallyl cyanurate, polyfunctional methacrylate monomers such as ethylene glycol dimethacrylate, diethylene glycol dimethacrylate, polyethylene glycol dimethacrylate, trimethylol propane trimethacrylate, and allyl methacrylate; and polyfunctional vinyl monomers such as vinyl butyrate and vinyl stearate can be incorporated during crosslinking by the aforementioned organic peroxide.

Using compounds such as those listed above can be expected to conduct a uniform and moderate crosslinking reaction. Particularly, divinyl benzene is the most preferable in the present invention. Divinyl benzene is easily handled; has good compatibility with the olefinic resin, the ethylene/α-olefin/unconjugated polyene copolymer rubber, and other olefinic rubbers as the main ingredients of the aforementioned crosslinked product; acts as a dispersing agent for organic peroxides; and has solubilizing action on organic peroxides, making it possible to obtain a thermoplastic elastomer composition in which the crosslinking by heat treatment are uniform and a balance between fluidity and physical properties is excellent.

The crosslinking coagent or polyfunctional vinyl monomer, and other compounds such as those described above are used in quantities usually corresponding to 2 parts by weight or less, preferably 0.2 to 1 part by weight per 100 parts by weight of the total quantity of the pelletized olefinic resin and pulverized bulk olefinic rubber.

To promote the decomposition of the organic peroxide, it is also possible to use triethylamine, tributylamine, 2,4,6-tri (dimethylamino)phenol, and other tertiary amines; naphthenates of aluminum, cobalt, vanadium, copper, calcium, zirconium, manganese, magnesium, lead, mercury, and the like; and other decomposition accelerators.

In the present invention, dilution of the aforementioned crosslinking agents with diluents selected from organic solvents and oils is preferred. When crosslinking coagents, polyfunctional vinyl monomers, and/or decomposition accelerators are used, dilution is performed with a diluent together with a crosslinking agent. When a crosslinking agent-containing solution (C') obtained by diluting the crosslinking agent with a diluent is added, the crosslinking agent (C) is incorporated in an amount that is preferably 0.02 to 5 parts by weight, more preferably 0.05 to 3 parts by weight per 100 parts by weight of the total quantity of pelletized olefinic resin (A) and pulverized bulk olefinic rubber (B).

The organic solvents and oils used as diluents may be commonly known compounds, but the aforementioned crosslinking agents, crosslinking coagents, other polyfunctional vinyl monomers, and decomposition accelerators uniformly dissolving organic solvents or oils are preferable.

In the present invention, when an organic peroxide preferably used as a crosslinking agent and divinyl benzene are used as a crosslinking coagent, the liquid for diluting these components is preferably a paraffin-based oil because of uniform solubility.

Also, the crosslinking agent (C) to diluent weight ratio is preferably 1/3 to 1/30, more preferably 1/3 to 1/10, even more preferably 1/3 to 1/7.

If the quantity of diluting liquid is 3 parts or more per 1 part of crosslinking agent, the crosslinking agent can be uniformly dispersed in the pulverized olefinic rubber, and a thermoplastic elastomer having uniform crosslinking can be obtained.

It is also less likely for slippage to occur in the continuous kneading machine, and for kneading defects to form when the quantity of diluting liquid is 30 parts or less per 1 part of crosslinking agent.

The dynamic heat treatment in the present invention is preferably performed with a closed-type continuous kneading machine, and is preferably performed in nitrogen, carbon dioxide gas, or other inert gas atmosphere. The heat treatment temperature of the process is at most, ranging from the melting point of the polyolefin resin (A) to 350° C. The temperature is usually 150 to 300° C., preferably 170° C. to 270° C. The kneading time is usually 1 to 10 minutes, preferably 1 to 5 minutes. Expressed in terms of shear rate, the shear force exerted is preferably in a range of 10 to 20,000 $\sec^{-1}$, more preferably 100 to 10,000 $\sec^{-1}$.

A single- or twin-screw extruder, kneader, or the like can be used as the kneading machine, but a closed-type continuous kneading machine is preferred, and a twin-screw extruder is particularly preferred.

Twin-screw extruders that can preferably be used in the present invention may include any of those in which two screws turn in the same direction or in different directions, in which two screws do or do not mesh together, or the like, but those in which two screws turn in the same direction and mesh together are particularly preferred.

The length to diameter ratio (L/D) of the screws in the twin-screw extruder used in the present invention is usually not less than 25 and not more than 70, preferably not less than 30 and not more than 65, more preferably not less than 34 and not more than 60.

In the present invention, softeners may be continuously fed into the continuous kneading machine as needed. These are preferably fed through an injection port that is separate from the hopper opening through which the pelletized olefinic resin and pulverized bulk olefinic rubber are fed.

When a twin-screw extruder preferably used in the present invention is employed as the continuous kneading machine, the softener is preferably fed in a continuous manner into the barrel of the twin-screw extruder through a feeding port that is opened at a position further toward the die than the center point of the total length of the barrel.

Also in the present invention, the rubber in the olefinic thermoplastic elastomer composition has a gel content, as measured by the hereinafter described method, that is preferably within a range of not less than 30% by weight, more preferably not less than 50% by weight.

(Gel Content Measurement Method)

A 100-mg sample of thermoplastic elastomer composition was gathered, cut into 0.5 mm×0.5 mm×0.5 mm fragments, placed on a filter paper after being soaked for 48 hours at 23° C. in 30 mL of cyclohexane in a sealed container, and dried for 72 hours or more at room temperature until a constant mass was established.

The value obtained by subtracting from the weight of this dried residue the weight of all ingredients (fibrous fillers, bulking agents, pigments, and the like) not dissolved by cyclohexane other than polymer components, and the weight of crystalline olefinic resin (A) present in the sample before soaking in cyclohexane, was designated as the "corrected final weight (Y)."

The weight of ethylene/α-olefin/unconjugated polyene copolymer rubber present in the sample was designated as the "corrected initial weight (X)."

The gel content was found according to the following formula:

Gel content (weight %)=(Corrected final weight (Y)/ Corrected initial weight (X))×100

An olefinic thermoplastic elastomer composition having excellent tensile characteristics and molded appearance can be manufactured with high productivity by the method for manufacturing an olefinic thermoplastic elastomer of the present invention.

An olefinic thermoplastic elastomer manufactured in accordance with the present invention possesses the above described excellent characteristics and is therefore suitable for the following applications.

Automobile instrument panels, doors, ceilings, seats, and other interior surface coverings; automobile bumpers, mud guards, side moldings, window moldings, roof moldings, and other exterior parts; automobile glass run channels, weather-stripping, window moldings, and various other seals; various gaskets, seals, and sheets used in the fields of civil engineering and construction; miscellaneous goods for daily use and the like.

EXAMPLES

The present invention will be described by way of examples hereinafter, but the present invention is in no way limited by these examples. Described below are the methods used to measure the physical properties of the olefinic thermoplastic elastomer composition in the examples and comparative examples.

(Methods for Measuring Physical Properties)
(1) Tensile strength: Tensile strength at break was measured in accordance with JIS K 6301 at a stress rate of 200 mm/min.
(2) Break elongation: Break elongation at fracture point was measured in accordance with JIS K 6301 at a stress rate of 200 mm/min.
(3) b-Value: Yellowness (b-value) was measured by spectrophotometer.
(4) Number of bumps: Pellets of the thermoplastic elastomers obtained in the examples and comparative examples were fed to a single-screw extruder, a length of 50 cm was cut off from a molded article of olefinic thermoplastic elastomer which was extrusion-molded under the conditions below, and the number of bumps (minute protrusions) of 0.3 mm or greater on the surface of the molded article was examined using a graduated magnifying glass.

Conditions:
Extruder: 50-mm single-screw extruder, L/D=24
Screw: full flight
Compression ratio: 3.5
Set temperature: C1/C2/C3/C4/C5/H/D=160/170/180/190/ 200/210/210
Cross-sectional shape of die: 25×2 mm, corner rounding 1R
Discharge rate: 7.2 kg/h Example 1

A friable bale (25 kg) of ethylene/propylene/5-ethylidene-2-norbornene copolymer rubber (B-1; Mooney viscosity ML1+4 (100° C.) 94, ethylene content 78 mol %, iodine value 13) was pulverized in a pulverizing machine (manufactured by Horai, Inc. U-480) equipped with a punching plate of 8-mm-diameter holes.

A uniform mixture of 60 parts by weight of the pulverized product, 40 parts by weight of propylene homopolymer (A-1; MFR (ASTM D1238-65T, 230° C.) 11 g/10 min, density 0.91 g/cm$^3$) pellets, 0.2 part by weight of 2,5-dimethyl-2,5-di(tert-butylperoxy)hexyne-3 (1-minute half-life temperature: 193° C.) and 0.3 part by weight of divinyl benzene diluted and uniformly mixed with 1.0 part by weight of paraffin oil (kinetic viscosity at 40° C.: 90 cSt) was thoroughly stirred and mixed in a Henschel mixer, the product was introduced into the hopper of a twin-screw extruder, 20 parts by weight of paraffin-based mineral oil (process oil manufactured by Idemitsu Kosan Co., Ltd., PW-380) were stably fed by a pump through a supply port in the eighth barrel out of a total of 11 barrels, dynamic crosslinking was performed, and thermoplastic elastomer pellets were thus manufactured under the conditions below.

Extruder: meshed twin-screw extruder (same turn direction)
Screw diameter: 46 mm
L/D: 44
Set Temperature: C1/C2/C3/C4/C5/C6/C7/C8/C9/C10/C11/ D=120/120/140/140/160/180/200/220/220/220/220/200
Rotational speed: 450 rpm
Extrusion rate: 100 kg/h The resultant pellets were then press-molded at 190° C., punched out into a prescribed shape, and measured to determine physical properties. The results are shown in Table 1.

Example 2

A friable bale (25 kg) of ethylene/propylene/5-ethylidene-2-norbornene copolymer rubber (B-2; Mooney viscosity ML1+4 (100° C.) 63, ethylene content 72 mol %, iodine value 22) was pulverized in a pulverizing machine (manufactured by Horai, Inc. U-480) equipped with a punching plate of 8-mm-diameter holes.

A uniform mixture of 50 parts by weight of the pulverized product, 30 parts by weight of propylene homopolymer (A-2; MFR (ASTM D1238-65T, 230° C.) 20 g/10 min, density 0.91 g/cm$^3$) pellets, 20 parts by weight of ethylene/butene-1 random copolymer (A-3; MFR (190° C.) 10 g/10 min, density 0.93 g/cm$^3$, ethylene content 97 mol %), 0.2 part by weight of 2,5-dimethyl-2,5-di(tert-butylperoxy)hexyne-3 and 0.3 part by weight of divinyl benzene diluted and uniformly mixed with 1.0 part by weight of paraffin oil (kinetic viscosity at 40° C.: 90 cSt) was thoroughly stirred and mixed in a Henschel mixer, the product was introduced into the hopper of a twin-screw extruder, 15 parts by weight of paraffin-based mineral oil (process oil manufactured by Idemitsu Kosan Co., Ltd., PW-380) were stably fed by a pump through a supply port in the eighth barrel out of a total of 11 barrels, dynamic crosslinking was performed, and thermoplastic elastomer pellets were thus manufactured. Physical properties thereof were evaluated in the same manner as in example 1. The results are shown in Table 1.

Example 3

An olefinic thermoplastic elastomer was manufactured in the same manner as in example 1, except that 75 parts by weight of ethylene/propylene/dicyclopentadiene copolymer rubber (B-3; extended with 40 parts by weight of paraffin-based mineral oil (PW-380) per 100 parts by weight of B-3 having a Mooney viscosity ML1+4 (100° C.) of 150, an ethylene content of 78 mol %, and an iodine value of 8) instead of 60 parts by weight of ethylene/propylene/5-ethylidene-2-norbornene copolymer rubber (B-1) and 25 parts by weight of propylene homopolymer were used, and that the oil was not fed directly into the extruder; and physical properties thereof were evaluated in the same manner as in example 1. The results are shown in Table 1.

Example 4

A friable bale (25 kg) of ethylene/propylene/5-ethylidene-2-norbornene copolymer rubber (B-1) was pulverized in the same manner as in example 1.

60 parts by weight of the pulverized product, 40 parts by weight of propylene homopolymer (A-1) pellets, 0.2 part by weight of 2,5-dimethyl-2,5-di(tert-butylperoxy)hexyne-3, and 0.3 part by weight of divinyl benzene were thoroughly stirred and mixed in a Henschel mixer; the product was introduced into the hopper of a twin-screw extruder, 20 parts by weight of paraffin-based mineral oil (process oil manufactured by Idemitsu Kosan Co., Ltd., PW-380) were stably fed by a pump through a supply port in the eighth barrel out of a total of 11 barrels, dynamic crosslinking was performed, and thermoplastic elastomer pellets were manufactured in the same manner as in example 1, except that the paraffin oil for dilution was not used. The results are shown in Table 1.

Example 5

A friable bale (25 kg) of ethylene/propylene/5-ethylidene-2-norbornene copolymer rubber (B-1) was pulverized in the same manner as in example 1.

A uniform mixture of 60 parts by weight of the pulverized product, 40 parts by weight of propylene homopolymer (A-1) pellets, 0.2 part by weight of 2,5-dimethyl-2,5-di(tert-butylperoxy)hexyne-3 and 0.3 part by weight of divinyl benzene diluted and uniformly mixed with 8 parts by weight of paraffin oil (kinetic viscosity at 40° C.: 90 cSt) was thoroughly stirred and mixed in a Henschel mixer, the product was introduced into the hopper of a twin-screw extruder, 20 parts by weight of paraffin-based mineral oil (process oil manufactured by Idemitsu Kosan Co., Ltd., PW-380) were stably fed by a pump through a supply port in the eighth barrel out of a total of 11 barrels, dynamic crosslinking was performed, and thermoplastic elastomer pellets were thus manufactured in the same manner as in example 1, except that the paraffin oil for dilution amounted to 8 parts by weight. The results are shown in Table 1.

Example 6

A friable bale (25 kg) of ethylene/propylene/5-ethylidene-2-norbornene copolymer rubber (B-1) was pulverized in the same manner as in example 1.

A uniform mixture of 60 parts by weight of the pulverized product, 40 parts by weight of propylene homopolymer (A-1) pellets, 0.2 part by weight of 2,5-dimethyl-2,5-di(tert-butylperoxy)hexyne-3 and 0.3 part by weight of divinyl benzene diluted and uniformly mixed with 1.0 part by weight of paraffin oil (kinetic viscosity at 40° C.: 90 cSt) was thoroughly stirred and mixed in a Henschel mixer, the product was introduced into the hopper of a twin-screw extruder, 20 parts by weight of paraffin-based mineral oil (process oil manufactured by Idemitsu Kosan Co., Ltd., PW-380) were stably fed by a pump through a supply port in the fourth barrel out of a total of 11 barrels, dynamic crosslinking was performed, and thermoplastic elastomer pellets were thus manufactured in the same manner as in example 1, except that the position of the barrel for injecting paraffin-based oil was altered. The results are shown in Table 1.

Comparative Example 1

A friable bale (25 kg) of ethylene/propylene/5-ethylidene-2-norbornene copolymer rubber (B-1) was pulverized in the same manner as in example 1.

The resultant pulverized product was formed into pellets by a strand cutter after being fed into a single-screw extruder having a diameter of 50 mm, melted, and cooled in a water bath. Except the use of the resulting ethylene/propylene/5-ethylidene-2-norbornene copolymer rubber (R-1) pellets, an olefinic thermoplastic elastomer was manufactured and measured to determine the physical properties in the same manner as in example 1. The results are shown in Table 1. In addition, the conditions of the single-screw extruder were as outlined below.

Set temperature: C1/C2/C3/C4/C5/H/D=100/150/160/170/180/180/180

Screw type: full flight

Rotational speed of screw: 50 rpm

Comparative Example 2

An olefinic thermoplastic elastomer was manufactured in the same manner as in example 4 and measured to determine the physical properties in the same manner as in example 1, except that the ethylene/propylene/5-ethylidene-2-norbornene copolymer rubber (R-1) pellets obtained in comparative example 1 were used instead of the pulverized ethylene/propylene/5-ethylidene-2-norbornene copolymer rubber (B-1). The results are shown in Table 1.

Comparative Example 3

An olefinic thermoplastic elastomer was manufactured in the same manner as in example 5 and measured to determine the physical properties in the same manner as in example 1, except that the ethylene/propylene/5-ethylidene-2-norbornene copolymer rubber (R-1) pellets obtained in comparative example 1 were used instead of the pulverized ethylene/propylene/5-ethylidene-2-norbornene copolymer rubber (B-1). The results are shown in Table 1.

Comparative Example 4

An olefinic thermoplastic elastomer was manufactured in the same manner as in example 6 and measured to determine the physical properties in the same manner as in example 1, except that the ethylene/propylene/5-ethylidene-2-norbornene copolymer rubber (R-1) pellets obtained in comparative example 1 were used instead of the pulverized ethylene/propylene/5-ethylidene-2-norbornene copolymer rubber (B-1). The results are shown in Table 1.

TABLE 1

|  | EXAMPLES | | | | | | COMPARATIVE EXAMPLES | | | |
|---|---|---|---|---|---|---|---|---|---|---|
|  | 1 | 2 | 3 | 4 | 5 | 6 | 1 | 2 | 3 | 4 |
| ETHYLENE/α-OLEFIN/UNCONJUGATED POLYENE COPOLYMER RUBBER | | | | | | | | | | |
| B-1(PULVERIZED PRODUCT) | 60 | | | 60 | 60 | 60 | | | | |
| R-1(B-1 PELLETIZED) | | | | | | | 60 | 60 | 60 | 60 |
| B-2(PULVERIZED PRODUCT) | | 50 | | | | | | | | |
| B-3(PULVERIZED PRODUCT) | | | 75 | | | | | | | |
| OLEFINIC RESIN | | | | | | | | | | |
| A-1 | 40 | | 25 | 40 | 40 | 40 | 40 | 40 | 40 | 40 |
| A-2 | | 30 | | | | | | | | |
| A-3 | | 20 | | | | | | | | |
| CROSSLINKING AGENT MASTER BATCH | | | | | | | | | | |
| 2,5-DIMETHYL-2,5 DI(t-BUTYLPEROXY)HEXYNE-3 | 0.2 | 0.2 | 0.2 | 0.2 | 0.2 | 0.2 | 0.2 | 0.2 | 0.2 | 0.2 |
| DIVINYL BENZENE | 0.3 | 0.3 | 0.3 | 0.3 | 0.3 | 0.3 | 0.3 | 0.3 | 0.3 | 0.3 |
| PARAFFIN OIL FOR DILUTION | 1.0 | 1.0 | 1.0 | 0 | 8.0 | 1.0 | 1.0 | 0 | 8.0 | 1.0 |
| SOFTENER FED DIRECTLY TO EXTRUDER | | | | | | | | | | |
| PW-380 | 20 | 15 | 0 | 20 | 20 | 20 | 20 | 20 | 20 | 20 |
| BARRELS FOR FEEDING SOFTENER PW-380 | 8 | 8 | — | 8 | 8 | 4 | 8 | 8 | 8 | 4 |
| PHYSICAL PROPERTIES. | | | | | | | | | | |
| GEL CONTENT (%) | 74 | — | 71 | 78 | 71 | 70 | 72 | 77 | 70 | 70 |
| STRENGTH (MPa) | 8.5 | 10.8 | 7.5 | 6.5 | 6.9 | 7.3 | 7.7 | 6.1 | 6.3 | 6.2 |
| ELONGATION (%) | 640 | 650 | 590 | 450 | 470 | 510 | 560 | 410 | 400 | 430 |
| b-VALUE (−) | 7.1 | 7.6 | 7.2 | 7.3 | 7.0 | 7.2 | 10.2 | 10.6 | 9.9 | 9.7 |
| NUMBER OF BUMPS (COUNT) | 0 | 2 | 1 | 13 | 7 | 9 | 0 | 8 | 17 | 21 |

IT IS ASSUMED IN EXAMPLE 2 THAT OLEFINIC RESIN A-3 IS CROSSLINKED, AND NO GEL CONTENT MEASUREMENTS ARE THEREFORE PERFORMED.

What is claimed is:

1. A method for manufacturing a thermoplastic elastomer composition, comprising:
   continuously feeding a mixture comprising 10 to 60 parts by weight pelletized olefinic resin (A) having a mean grain diameter of from 1 to 10 mm, 40 to 90 parts by weight of a pulverized product (B) obtained by pulverizing bulk ethylene/α-olefin/unconjugated polyene copolymer rubber obtained by copolymerizing ethylene, an α-olefin having 3 to 20 carbon atoms, and an unconjugated polyene that is not melted or pelletized after pulverization wherein the size of the pulverized product is such that 90% or more of the particles thereof can pass through a punching plate having holes of 10 mm diameter, where the total quantity of components (A) and (B) is 100 parts by weight, and 0.02 to 5 parts by weight of a crosslinking agent (C) into a continuous kneading machine; and
   performing a dynamic heat treatment to yield the thermoplastic elastomer composition,
   wherein said thermoplastic elastomer composition has excellent tensile characteristics and molded appearance.

2. The method for manufacturing a thermoplastic elastomer composition according to claim 1, wherein the continuous kneading machine is a twin-screw extruder.

3. The method for manufacturing a thermoplastic elastomer composition according to claim 1, wherein a mixture comprising pelletized olefinic resin (A), a pulverized product (B) obtained by pulverizing bulk olefinic rubber, and a crosslinking agent-containing solution (C') obtained by diluting the crosslinking agent (C) with a diluent selected from organic solvents and oils, is continuously fed into a continuous kneading machine and dynamically heat-treated to yield the thermoplastic elastomer composition.

4. The method for manufacturing a thermoplastic elastomer composition according to claim 3, wherein the crosslinking agent-containing solution (C') comprises an organic peroxide diluted with a paraffin-based oil.

5. The method for manufacturing a thermoplastic elastomer composition according to claim 3, wherein the crosslinking agent-containing solution (C') used is one in which the weight ratio of crosslinking agent (C) to diluent (crosslinking agent (C)/diluent) is 1/3 to 1/30.

6. The method for manufacturing a thermoplastic elastomer composition according to claim 1, wherein a softener is continuously fed into the resin kneading machine.

7. The method for manufacturing a thermoplastic elastomer composition according to claim 6, wherein the softener is fed continuously into the barrel of the twin-screw extruder through a feeding port that is opened at a position further toward the die than the center point of the total length of the barrel wherein a mixture of the pelletized olefinic resin (A), the pulverized product (B) obtained by pulverizing bulk olefinic rubber and the crosslinking agent (C) are fed continuously through a hopper opening of the twin-screw extruder.

* * * * *